(12) United States Patent
Rodarte Garcia

(10) Patent No.: US 9,908,318 B1
(45) Date of Patent: Mar. 6, 2018

(54) CARPET DIVIDER SYSTEM

(71) Applicant: Antero Rodarte Garcia, Toluca (MX)

(72) Inventor: Antero Rodarte Garcia, Toluca (MX)

( * ) Notice: Subject to any disclaimer, the term of this patent is extended or adjusted under 35 U.S.C. 154(b) by 0 days.

(21) Appl. No.: 15/393,390

(22) Filed: Dec. 29, 2016

(30) Foreign Application Priority Data

Sep. 6, 2016 (MX) .................... MX/a/2016/011504

(51) Int. Cl.
*B32B 38/10* (2006.01)
*B32B 43/00* (2006.01)

(52) U.S. Cl.
CPC .......... *B32B 43/006* (2013.01); *B32B 43/003* (2013.01); *B32B 38/10* (2013.01); *B32B 2471/02* (2013.01); *Y10T 156/1168* (2015.01); *Y10T 156/1184* (2015.01); *Y10T 156/1189* (2015.01); *Y10T 156/1961* (2015.01); *Y10T 156/1972* (2015.01)

(58) Field of Classification Search
CPC . B32B 38/10; B32B 43/006; Y10T 156/1168; Y10T 156/1184; Y10T 156/1189; Y10T 156/1961; Y10T 156/1972
USPC ................ 156/714, 717, 718, 761, 763, 764
See application file for complete search history.

(56) References Cited

U.S. PATENT DOCUMENTS

| | | | | |
|---|---|---|---|---|
| 2,105,215 A | * | 1/1938 | Dinzl .................... | B29B 15/023 144/193.1 |
| 2,496,018 A | * | 1/1950 | Pearson ................ | B26D 1/305 125/23.01 |
| 3,020,636 A | * | 2/1962 | Ayton .................... | B23D 3/02 72/325 |
| 3,159,913 A | * | 12/1964 | Winton ................ | B23D 29/026 30/233 |
| 3,611,538 A | * | 10/1971 | Takamatsu ............ | A44B 19/58 29/33.2 |
| 4,233,871 A | * | 11/1980 | Alessi .................... | B23D 17/08 83/607 |
| 6,487,887 B2 | * | 12/2002 | Yamada ................ | B21D 37/205 30/258 |
| 8,176,640 B2 | * | 5/2012 | Gullicks .................. | B26B 3/08 30/2 |

* cited by examiner

*Primary Examiner* — Mark A Osele
*Assistant Examiner* — Nickolas Harm
(74) *Attorney, Agent, or Firm* — McDonnell Boehnen Hulbert & Berghoff LLP

(57) ABSTRACT

Methods, systems and devices to divide a layer of a first material from another material, to which is attached, are provided. Particularly, for the separation of the PVC from a modular carpet. By the use of a parallel blades mechanism that through an opposite counterpart apply at least a shear stress over the material of the modular carpet to tear the PVC layer and divide it. The carpet is preheated to facilitate the process of division and reuse of said PVC.

19 Claims, 9 Drawing Sheets

CARPET DIVIDER SYSTEM

CROSS-REFERENCE TO RELATED APPLICATIONS

The present disclosure claims priority to Mexican patent application number MX/a/2016/011504, filed on Sep. 6, 2016, the entire contents of which are herein incorporated by reference.

FIELD OF THE INVENTION

The present invention relates to the field of mechanic wherein is desirable to divide a material layer of a layer of another material where is attached, but particularly to the field of recycling modular carpets where is the removal of a PVC layer and/or NYLON layer of said carpets for its utilization from preheating and applied shear stress over said modular carpet.

BACKGROUND

A carpet is an article that is commonly used to cover the rooms' floor and stairs for ornament and shelter. In this sense, there are carpets manufactured completely with nylon fibers but also there are carpets defined as composite materials since they are manufactured in nylon with a bed of PVC which provides strength. The colored and fluffy part of the carpet corresponds to the tissue or upper layer, which commonly is manufactured in nylon, however other materials can be used. These carpets manufactured of PVC and nylon are commonly called modular carpets and they are used in bureaus and places where the transit of people are considered as heavy traffic. Similarly, there are virgin modular carpets and recycled modular carpets, where the virgin ones are those carpets whose PVC layer is 100% virgin, namely, that has not been used or recycled previously. The recycled modular carpets, instead, have already been recycled at least partially once, namely, the used material have been recycled previously. In this sense, in the art is common to identify a virgin carpet of a recycled carpet by the final color of the PVC layer.

The nylon tissue and the PVC are thermally fused, where the PVC bed is commonly located granularly on the rear face of the nylon tissue where the temperature is elevated to a fusion temperature of the PVC, in such a way that the PVC in liquid form is adhered to the nylon to, after some intermedia processes, cool and obtain a final product of modular carpet. In these sense, the fusion temperature of the PVC is minor that the fusion temperature of nylon, in a way that allows the thermal fuse. The temperature of the carpet is raised using furnaces or any similar method. In some cases, the nylon is placed over a base for tissue, where said base is commonly a thin layer of latex, such a way that in the middle of the PVC layer and the nylon layer is located said base.

The success of the modular carpets in the market results in the need of a high demand for raw materials for manufacturing, so there is the need to obtain either PVC or Nylon from any constant source.

In this regard, it has been identified that it is possible to extract the PVC material of the modular carpet already used or as a waste for its reutilization in the manufacture of new modular carpets. In other words, it is possible to manufacture new carpets from either old or used carpets, wherein in order to reutilize the materials from the old carpets, it is necessary to separate the PVC from the nylon in an as clean as possible way.

In the art it has been found that the way to separate the PVC from the nylon is firstly by heating the old or to-be-recycled carpet to a temperature normally higher than 145° C.+−10° C., which facilitates the de-adhesion between materials, so that subsequent and immediately a technician can perform such separation manually, i.e. pulling each layer of material to an opposite side. It is noteworthy that raise the temperature does not have a linear relationship with the manual separation of PVC from the nylon, since exceeding a temperature threshold the separation becomes more complicated because the material is in a semi-liquid or viscous state. In this regard, it has been identified that manual operation reflects uncertainty and/or does not ensure the repeatability of operation, which is desired in order to obtain constant amounts of PVC and/or nylon. For example, the separation is performed with the hands of each technician, wherein the force varies according to the conditions and capacity of each of them. Additionally, it has also been identified that manual separation is inefficient, since once separation is attempted, large amounts of PVC remain on the nylon layer still adhered i.e. resulting in a contaminated nylon layer. Said contaminated nylon layer is discarded, since it is impractical retrying to separate said workpiece because it would take a long time to the technician, and the material temperature at that moment is already lower. In other words, the technique of manual separation is inefficient in the use of resources and the result obtained.

In that way it is desirable obtaining a system, method and/or device or apparatus capable to perform the separation of the materials that comprise a composite material, so that a material is retrieved without contamination of the other one in a fast and/or clean way in comparison with the common techniques, and where the technique is able to be adjusted to different types of materials and/or prior joints for said materials. Furthermore, it is desirable to particularly obtain a separation technique for modular carpets, wherein said technique should provide a clean separation between the two materials, being essential that at the end the PVC is completely clean of Nylon, however it is also desirable that being essential that at the end the Nylon is completely clean of PVC, in both cases, either partially or completely for a piece of carpet or composite material.

SUMMARY

The present invention relates to methods, systems, devices and/or apparatus to obtain the separation of a first material from a second material in a piece comprised of said at least two materials.

Particularly, methods, systems, devices and/or apparatus for separating and collecting a PVC layer on a piece of carpet are provided. One skilled in the art will notice that the materials comprising the carpet or the composite piece may vary without affecting the subject matter of the present invention. Accordingly, a piece of carpet may be any composite piece comprised of at least two layers of different materials which are bonded by any known method as hot melt, wherein another equivalent bonding method known in the art may be used such as adhesive bonding. In the technique, a piece of carpet is comprised of a PVC layer, thus defining a first material, and a layer of nylon or fibers, thus defining a second material, wherein both layers are bonded by any method.

In an embodiment of invention, a mechanical arrangement is provided, that includes a pair of rigid blades separated a distance proportional to the thickness of the carpet. The blades are parallel with one another facing their broader flat face. In an embodiment of invention, the edge or angle of the blade will depend on the type of material to divide. Also, in a preferred embodiment, this angle or edge has an aperture of approximately 30°−5°+10° in relation to said flat layer of each blade. The blades have one degree of freedom, namely, they are movable relative to an axis wherein it may be an up-down axis (axis Z) or the cutting axis which is over the cutting plane with a travel or run previously defined and proportional to the length of the piece of carpet to divide. Additionally, each side of said axis defines a side A and a side B.

In an embodiment of invention, underneath the blades, at a distance that could provide an inlet zone of the piece of carpet, is a counterpart or base that is fixed with respect to the blades, which is defined by a base in a parallelepiped form, rigid with normally rounded corners. The counterpart or base is where longitudinally pass said blades, wherein there is a parallel, aligned, interleaved and/or centered relation, to generate a shear stress on the piece of carpet sufficient to begin tearing and subsequently continuously dividing the PVC from the nylon, i.e. the material is divided conforming the blades are running toward the counterpart on the cutting axis. To allow this step, the counterpart has a thickness less than the separation of the blades. The dimensions of said thickness vary depending of the thickness of the carpet and where at the beginning of the process of division, said counterpart, which is also named fixed counterpart, is moving within and parallel between the blades so that there is a division distance between the walls of said fixed counterpart and the inner walls of the blades where a layer of material already separated is confined, particularly the nylon layer, within the blades and covering the fixed counterpart. The separation distance between the fixed counterpart walls and the inner walls of the blades is proportional to the thickness of said nylon layer of the piece of carpet. After the division, the PVC layer is separated and it falls by gravity to a hopper or tank. In an embodiment, the division distance from the walls of said fixed counterpart to the inner walls of the blades is proportional to the thickness of the PVC layer of the carpet. In another embodiment of the invention, said division distance by both sides, namely, from the walls of said fixed counterpart to the inner walls of the blades, is the same. In another embodiment of the invention, said division distance is different in each side.

Thus, in an embodiment of the invention being the travel of the blades along the cutting axis, thus defining an up-down, the piece of carpet is placed with the PVC layer facing upwards and then, after the division, to fall by gravity downwards.

In an embodiment of the invention, the piece of carpet is placed at its middle-length in the inlet zone to be divided, wherein the travel or run of the blades is proportional to said middle-length, so that at the end of the travel, both sides of the piece of carpet fall by gravity to a hopper or tank, thus defining a division by full travel. An person skilled in the art, may note that a piece of carpet can be placed in the inlet zone in a position approximately the middle of the length of the piece with some variation without affecting the subject matter of the present invention.

In another embodiment of the invention, it is placed, in the inlet zone, a section of the piece of carpet defined by a minor distance to the middle of the length of the piece of carpet and corresponding to a sufficient distance for a pincer mechanism, also called grapple mechanism, automated or manual, to grasp the piece of carpet, wherein the travel or run of the blades is proportional to said section. In other words, the piece of carpet is placed in the inlet zone in such a way that the shear stress is not applied in the middle of said piece, but a minor section for one side and a greater section on the other side.

Thus, at the beginning of the division process, a PVC layer corresponding to said minor section falls by gravity to a hopper or tank, and the greater section remains separate and suspended in a known location by the use of an outlet element, subsequently the grapple mechanism is approaching to the known location from one end and grasps the greater section and then, by moving away maintaining said grasp, dividing the PVC material remaining at a speed and force constants, and once separated the whole length of the piece of carpet, the pincers release the PVC material and by gravity falling into the hopper or tank. Said mechanism is designed to provide a constant and pre-stablished division force, so this technique ensures repeatability and homogeneity. In an embodiment of the invention, the speed and the force magnitudes may vary with the time during the division process in order to be adapted to the material to be divided.

Once the division is concluded, the PVC material is in the hopper or tank, and the nylon is confined between the blades and the fixed counterpart, so that subsequently the blades are returned to their initial position. In an embodiment, a fixed ejector in the initial position of the blades is used to avoid that the nylon material remains stuck on said blades.

In an embodiment of the invention, the blades include heaters that heat said blades during the division process to avoid the thermal shock of the piece of carpet at the exit of the furnace, wherein the piece would be in direct contact with some blades that are at a temperature close to the temperature at the exit of the furnace and thus reducing the thermal shock. In a preferred embodiment, the blades are heated to around 100° C.+−10° C.

In a preferred embodiment, the blades are the movable part and the fixed counterpart is the fixed part. However, a person skilled in the art will notice that the counterpart may be the movable part and the blades fixed, and thus obtaining the same result.

Likewise, to ensure that the grapple mechanism will hold the largest section of PVC already divided, the outlet element is coupled on the blades in order to define an outward path for said largest section so that it is located in a previously known position. In an embodiment, said outlet element has a curve form that likewise allows the material to slide in a natural movement along said curved form to finish suspended in a location that depends on said outlet element by defining a path.

In an embodiment of the invention, a carpet divider method is claimed that includes a step of heating the piece of carpet using a furnace wherein said piece pass through a mechanized line, wherein the speed of said line ensure a dwell time of the piece to obtain an appropriate temperature for the division. Once the piece is heated, it is placed in a division device, wherein said device can be either by sections and grasp, or by full travel. In an embodiment, the division by sections and grasp is made in recycled carpets and the division by full travel is made in virgin carpets.

In an embodiment, the division device includes sensors of presence that indicate the presence of any object. Said sensors could be, but they are not limited to, inductive sensors, ultrasonic, infrared, etc. Also, temperature sensors are coupled to the mechanism to measure the temperature in different points of the division process.

The sensors and the automatized mechanism are coupled to a microprocessor, computer or computer readable medium.

DETAILED DESCRIPTION OF THE INVENTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Figure 1:
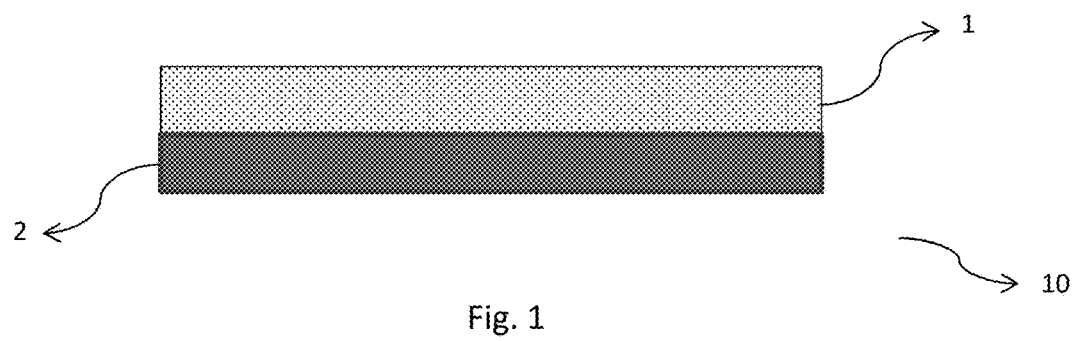
FIG. 1 shows a cross-sectional view of a piece of carpet including a PVC layer and Nylon layer.

FIG. 1 shows a cross-sectional view of a composite piece that it is also called carpet or piece of carpet 10, wherein it is shown a first material layer that can be called nylon 2 and a second material layer that can be called PVC 1. A person skilled in the art could would notice that the material used to made the composite piece may vary without affecting the subject matter of the present invention. Said composite piece includes a width, a length and a thickness. In said FIG. 1 it can be noticed that the thickness of each layer is similar; however, the thickness of each layer may be different without affecting the subject matter of the present invention.

Figure 2:
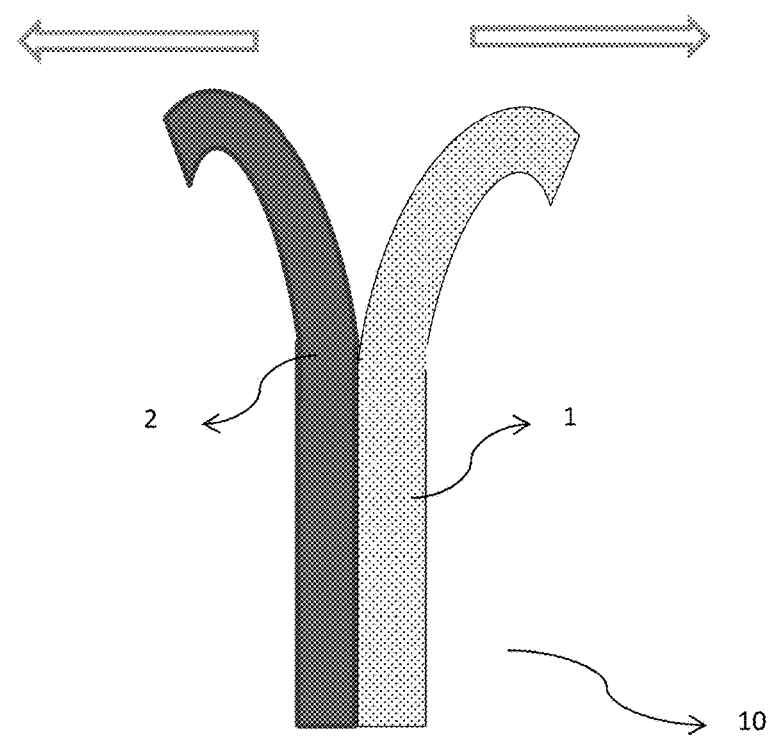
FIG. 2 shows a division example of the PVC from the nylon of a carpet known in the art.

In FIG. 2 it is shown an example of the division of PVC from nylon of one piece of carpet by pulling each layer towards the opposite direction as it is known in the art, wherein in order to facilitate said pulling, the temperature of the piece of carpet is increased, that is, a preheating step is applied. However, it has been identified that this method is inefficient, since many parts of PVC (not shown in the figures) remain in the layer of nylon or vice versa.

Figure 3:
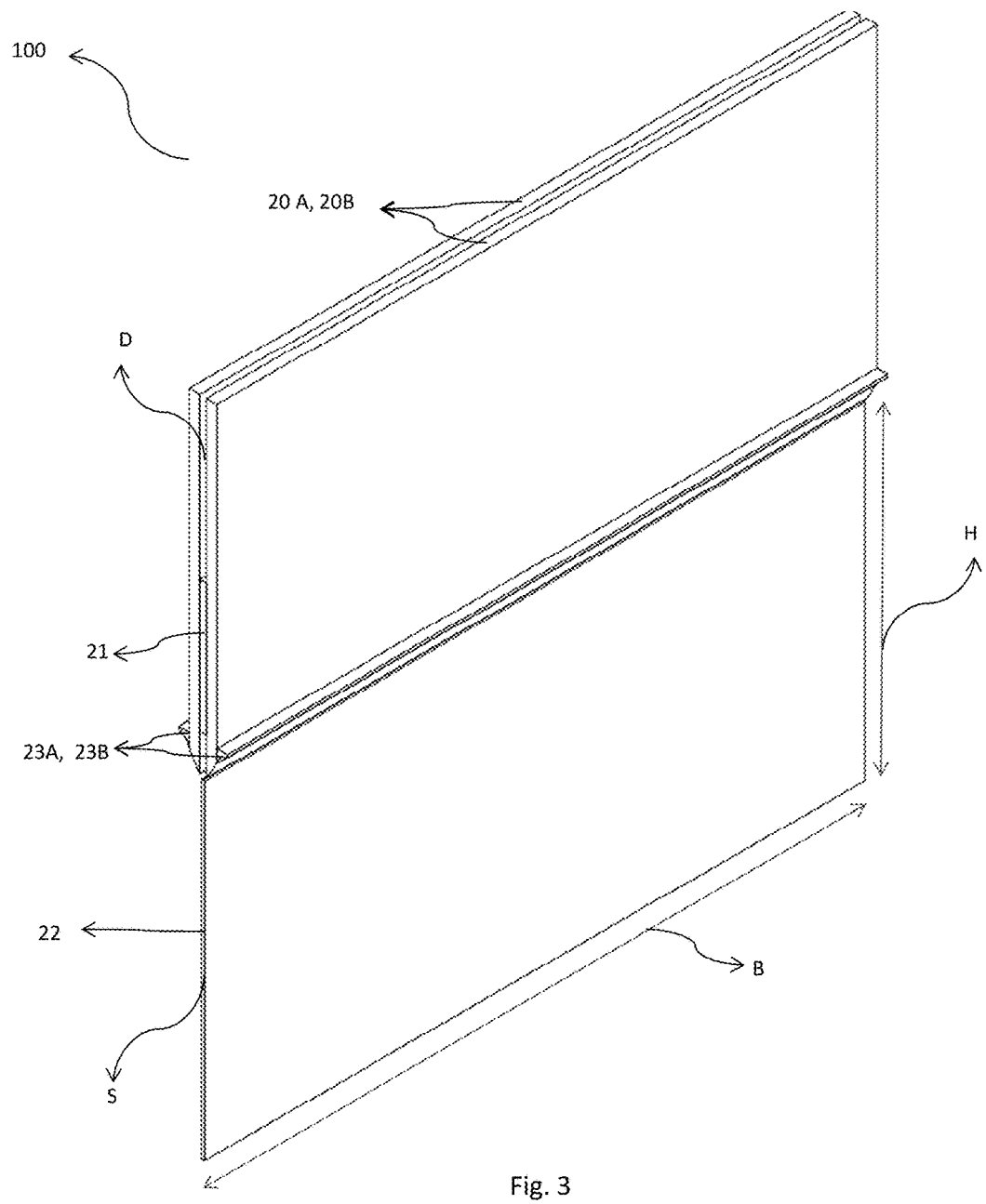
FIG. 3 shows an isometric view of an embodiment of the present invention and its parts.

FIG. 3 shows an isometric view of an embodiment of the present invention, wherein a device 100 is shown that includes two parallel blades 20 A and 20 B separated by a distance D. The blades 20 A and 20 B have a cutting travel towards a counterpart 22 that remains fixed respective to said blades 20 A and 20 B. At the end of the travel of the blades 20 A and 20 B, the counterpart 22 is placed within the separation D of said blades 20 A and 20 B, and wherein said blades and said counterpart are parallel disposed. The blades 20 A and 20 B have a height and a width that correspond to the height H and the width B of the counterpart 22, which also are proportional to width and length of the piece of carpet to be divided. Also, in an embodiment of the invention, the thickness of said blades depends on the thickness of each layer of the piece of carpet 10. In an embodiment of the invention, the height either of the blades 20 A and 20 B or of the counterpart 22 maintains a linear relationship with the travel or run of the blades 20 A and 20 B. The counterpart 22 has a thickness S whose dimensions depend on the piece of carpet 10. Likewise, the separation D between the blades has a magnitude that is dependent to the piece of carpet. In an embodiment of the invention, the separation distance D and the thickness S of the counterpart 22 maintain a relationship that varies according to the thickness of the nylon layer. In another embodiment of the invention, the separation distance D and the thickness S of the counterpart 22 maintain a relationship that varies according to the thickness of the PVC layer. Also, in FIG. 3 can be appreciated that any edge or end of the blades is aligned with each edge or end of the fixed counterpart. However, a person skilled in the art will notice that each alignment may vary without affecting the subject matter of the present invention.

In an embodiment of the invention, the device of the present invention includes at least one outlet element 23 A and 23 B, which is coupled to the blades 20 A and 20 B at the end of the cutting edge of said blades 20 A and 20 B, in such a way that said outlet elements 23 A and 23 B, during the division, define a known outward path for the separated material. In an embodiment of the invention, the outlet element has a curved form.

In an embodiment of the invention, the division device 100 of carpets includes an ejector or also known as drift punch 21, which is fixed respective to the movement of the blades 20 A and 20 B, wherein the drift punch 21, while the blades 20 A and 20 B return to their original position, make the waste that have remained adhered on the blades are to be taken out and then fall by gravity, i.e. the remnants are removed.

Figure 4:
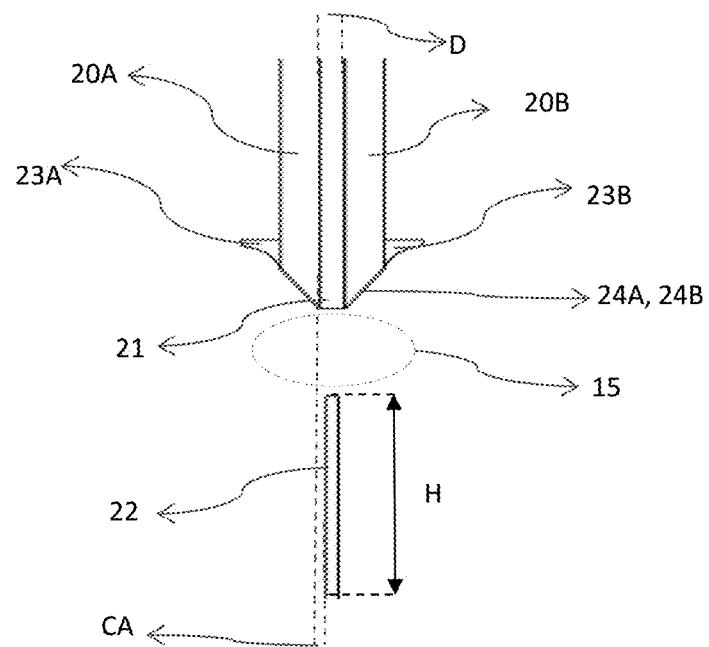
FIG. 4 shows a frontal view of an embodiment of the present invention.

FIG. 4 shows a frontal view of the device 100 of the present invention on an initial position, wherein the distance of separation D between blades 20 A and 20 B is appreciated. Also, it is appreciated the outlet element 23 A and 23 B, the ejector or drift punch 21, as well as the angle or cutting edge of blades. In an embodiment of the invention, said angle has a dimension of 30°–5°+10°. Likewise, the area which is between the blades 20 A and 20 B and the counterpart 22 is named inlet area 15, defining thus a room where the piece of carpet 10 is disposed. Furthermore, the distance of separation CA between the inner face of blade 20 A and the outer face of side A of the counterpart 22 is appreciated. In this regard, there is a separation distance CB (no shown in figures) corresponding to side B of the device 100. In an embodiment of the invention, said distances CA and CB are proportional to the thickness of the layer of nylon 2. In an embodiment of the invention, said distances CA and CB are proportional to the thickness of the layer of PVC 1.

Figure 5:
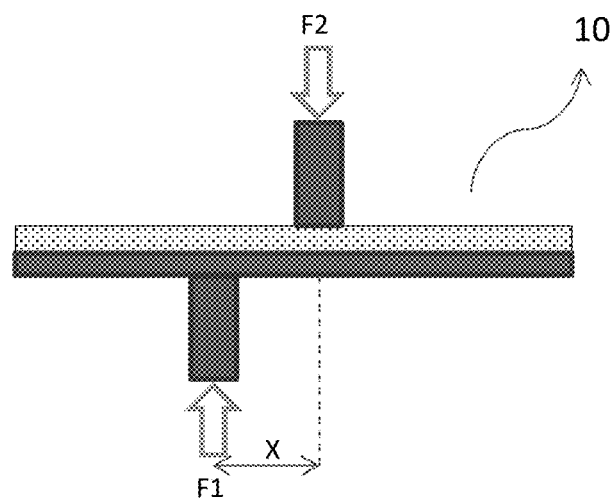
FIG. 5 shows a force diagram, wherein a single shear stress is applied on the piece of carpet.

FIG. 5 shows a diagram of forces F1 and F2 that, according to their configuration, apply a simple shear stress on a material, like a piece of carpet 10. The separation distance X between forces F1 and F2 varies according to the thickness of each layer comprising the piece of carpet, like the layer of PVC 1 and/or the layer of nylon 2, and wherein said separation distance X is lower than the thickness of the whole thickness of the piece of carpet 10. Said forces F1 and F2 once applied, with a separation distance X lower than the thickness of the piece of carpet, make the material to be bent, so after said bent at least one layer of the piece of carpet tears if said forces F1 and F2 remain applied in the same direction and sense.

Figure 6:
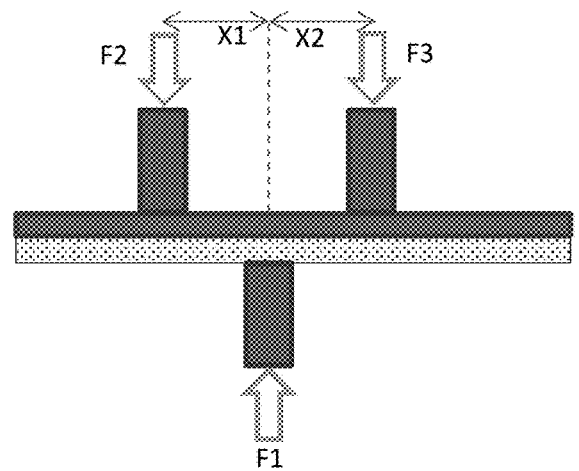
FIG. 6 shows a diagram of forces, where a double shear stress is applied on the piece of carpet.

FIG. 6 shows a diagram of forces F1, F2 and F3 applying a double shear stress on a material, like a piece of carpet 10, wherein the separation distance X1 and X2 between each force varies in accordance with the thickness of each layer comprising the piece of carpet, like the layer of PVC 1 and/or the layer of nylon 2. These forces F1, F2 and F3 when are applied with a separation distance X1 and X2 lower than the thickness of the piece of carpet, make the material to bend in and inverted U-form, in such a way that after the bending make at least one of the layers of the piece of carpet to tear and being separated of the other material about the same distance of travel of the forces, wherein the distance travel is also known as penetration distance or run.

Figure 7:
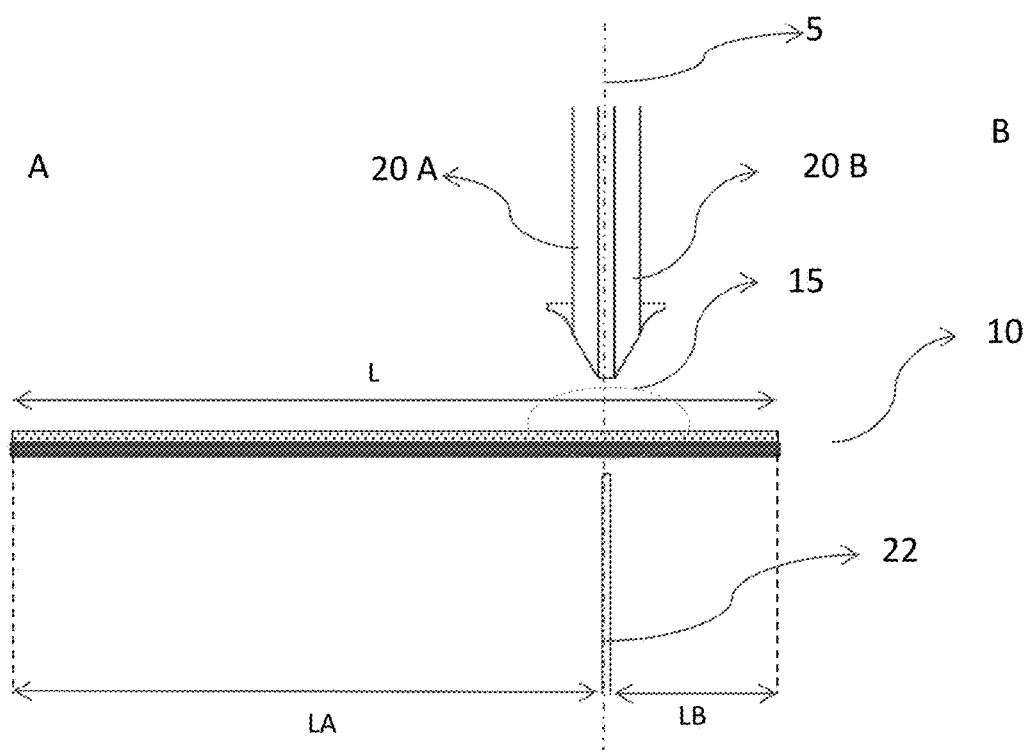
FIG. 7 shows a first execution moment in an embodiment of the present invention, wherein a section of a piece of carpet is placed in the inlet zone defined by the blades and counterpart, wherein said section has a predetermined length.

FIG. 7 shows a frontal view of an embodiment of the device 100 of the present invention in a first execution moment, wherein the blades 20 A and 20 B are in an initial position aligned with the drift punch 21. The piece of carpet 10 that includes a length L of piece of carpet, is disposed in the inlet area 15, so that if said piece of carpet 10 is disposed in a different point to the middle of said length L, a minor length LB and a greater length LA are defined, as shown in FIG. 7. Underneath the blades 20 A and 20 B is the counterpart 22 in such a way that, when said blades 20 A and 20 B finish their travel to the counterpart 22 in a straight downward path, along a cutting axis, said counterpart 22 is located inside and in centered relative to the two blades 20 A and 20 B. The run or travel of the counterpart 22 inside the blades 20 A and 20 B varies according to the length of the piece of carpet 10 and its disposition in the inlet zone 15, in such a way that considering LB and LA substantially equals, a full travel division is defined and, if LB and LA are different, a partial separation of the piece of carpet is defined.

Figure 8:
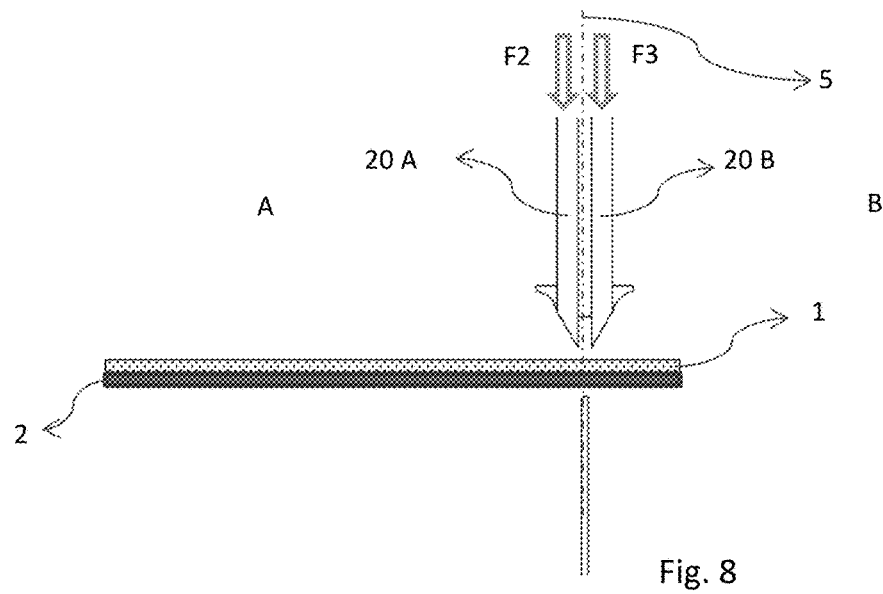
FIG. 8 shows a second execution moment in an embodiment of the present invention, wherein the blades start a linear travel in order to apply the double shear stress over the piece of carpet.

FIG. 8 shows a frontal view of an embodiment of device 100 of the present invention in a second moment, wherein the piece of carpet 10 is disposed and the blades 20 A and 20 B start their travel along the cutting axis 5. In this case, the piece of carpet is disposed with the layer of PVC 1 facing towards the blades and the layer of nylon 2 facing towards the counterpart 22. In an embodiment of the invention, the layer of PVC 1 is disposed facing towards the counterpart 22 and the layer of nylon 2 is disposed facing towards the blades 20 A and 20 B. Said piece of carpet is disposed according to a distance LB in the inlet area 15, that is, between the blades 20 A and 20 B and the counterpart 22, thus defining a first section of piece of carpet. Thus, in an embodiment of the invention, the penetration distance of the counterpart 22 inside the blades 20 A and 20 B is proportional to said distance LB.

The movement of said blades 20 A and 20 B, and the fixed counterpart 22, is represented by the application of the forces F2, F3 and F1 respectively. Each movable part performs a movement according to means already known in the art, like hydraulic pistons, electric actuators, worm screw mechanism, etc. A person skilled in the art will appreciate that the method used for applying force, and in consequence, movement to the blades and/or any movable element may vary without affecting the subject matter of the present invention. Also, the method used to hold the fixed elements respect to the movables may vary without affecting the subject matter of the present invention.

Figure 9:
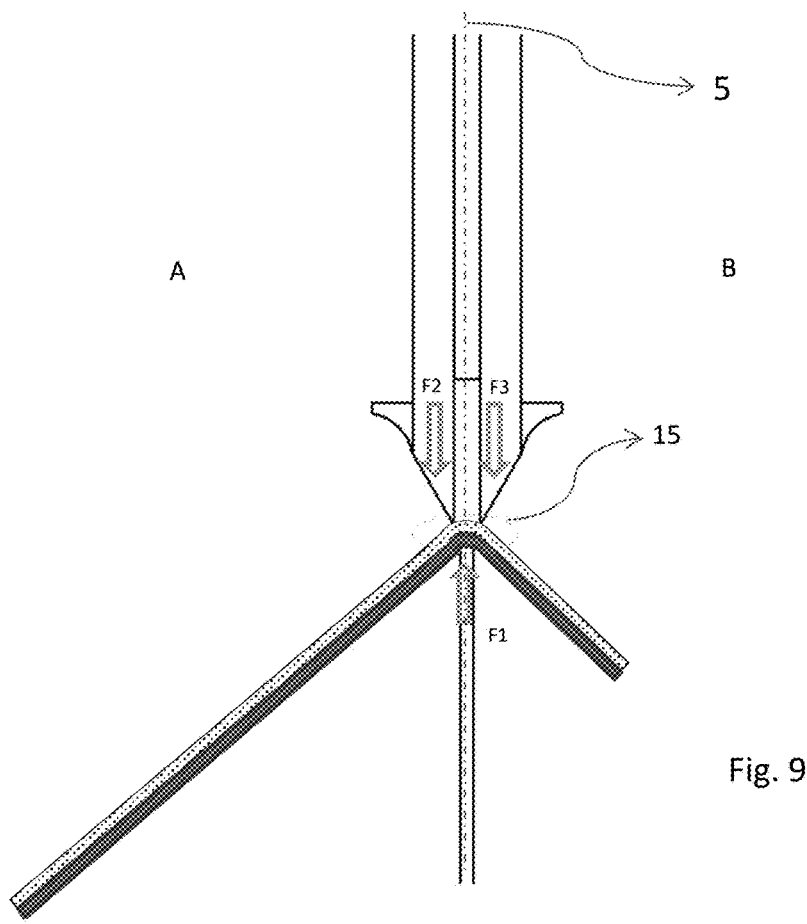
FIG. 9 shows a third execution moment in an embodiment of the present invention, wherein the piece of carpet starts to be flexed as a result of the double shear stress exerted on its surface, and wherein the upper face of said piece of carpet begins to tear.

FIG. 9 shows a frontal view of an embodiment of the device 100 of the present invention in a third moment just before the breaking or tear of the layer of PVC 1 (layer that in this case is facing towards the blades), wherein the piece of carpet 10 begins to experience a double shear stress by the parallels blades 20 A and 20 B and the counterpart 22. The edge or angle that the blades have makes easier the breaking of the layer of the material mentioned. Thus, by being flexible the piece of carpet, starts to bend in the inlet zone 15 according to the downward-run of the blades. Thus, an instant later (not shown in figures) the layer of PVC 1 is broken in the zone where the double shear stress is applied, particularly at the edge of the blades 20 A and 20 B.

Figure 10:
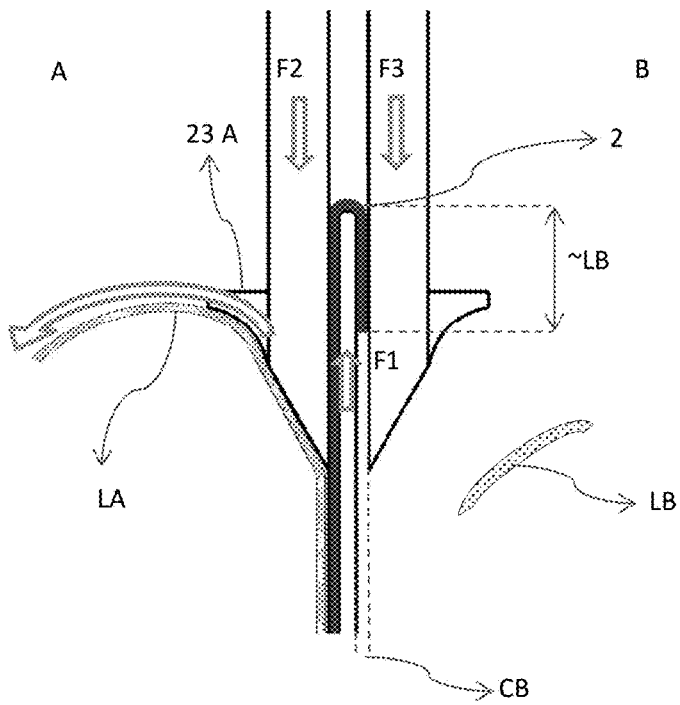
FIG. 10 shows a fourth execution moment in an embodiment of the present invention, wherein the section of side B has been obtained and the section of side A is on a known position using the outlet element. The section of carpet of side A, being in said known position, is now ready to be grasped by a grapple mechanism.

FIG. 10 shows a frontal view of an embodiment of device 100 of the present invention in a fourth moment, after the layer of PVC 1 has been teared starting the separation in the zone of the double shear stress, wherein the blades 20 A and 20 B continue their travel of penetration or run corresponding to a distance around or larger than LB, so that in the side A, the layer of PVC 1 is divided by the edge of the blade 20 A and directed through the outlet element 23 A towards the known position 16; and in the side B the layer of PVC 1 is separated by the edge of blade 20 B a distance around or larger than LB, so that said section LB already completely separated from the piece of carpet 10 falls by gravity in a hopper or deposit (not shown in figures). In this way, the layer of nylon 2 remains confined in the room defined by the inner surface of the blades 20 A and 20 B, and by the counterpart 22.

Figure 11:
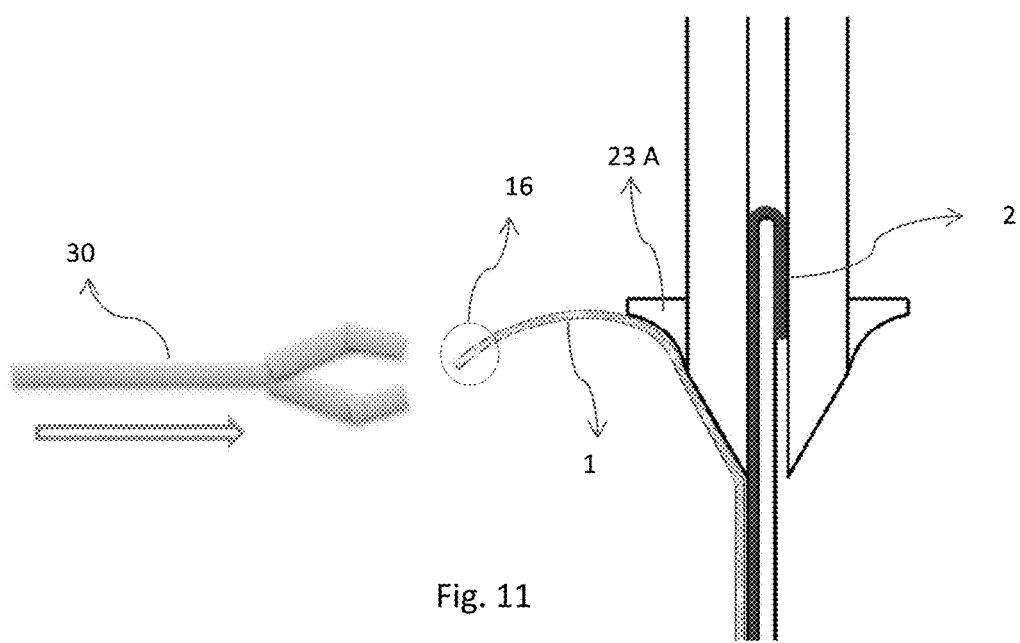
FIG. 11 shows a fifth execution moment in an embodiment of the present invention, wherein the pincer or grapple mechanism is getting closer to the side A of the section of carpet for its retention.

FIG. 11 shows a frontal view of an embodiment of the device 100 of the present invention in a fifth moment, wherein a grapple mechanism 30 is adapted to get closer and directed to the known position 16 defined by the outlet element 23 A in the side A. The grapple mechanism 30 may be comprised by a sole mechanism or a plurality of mechanisms. A person skilled in the art will notice that a grasp may be made by different methods without affecting the subject matter of the present invention.

Figure 12:
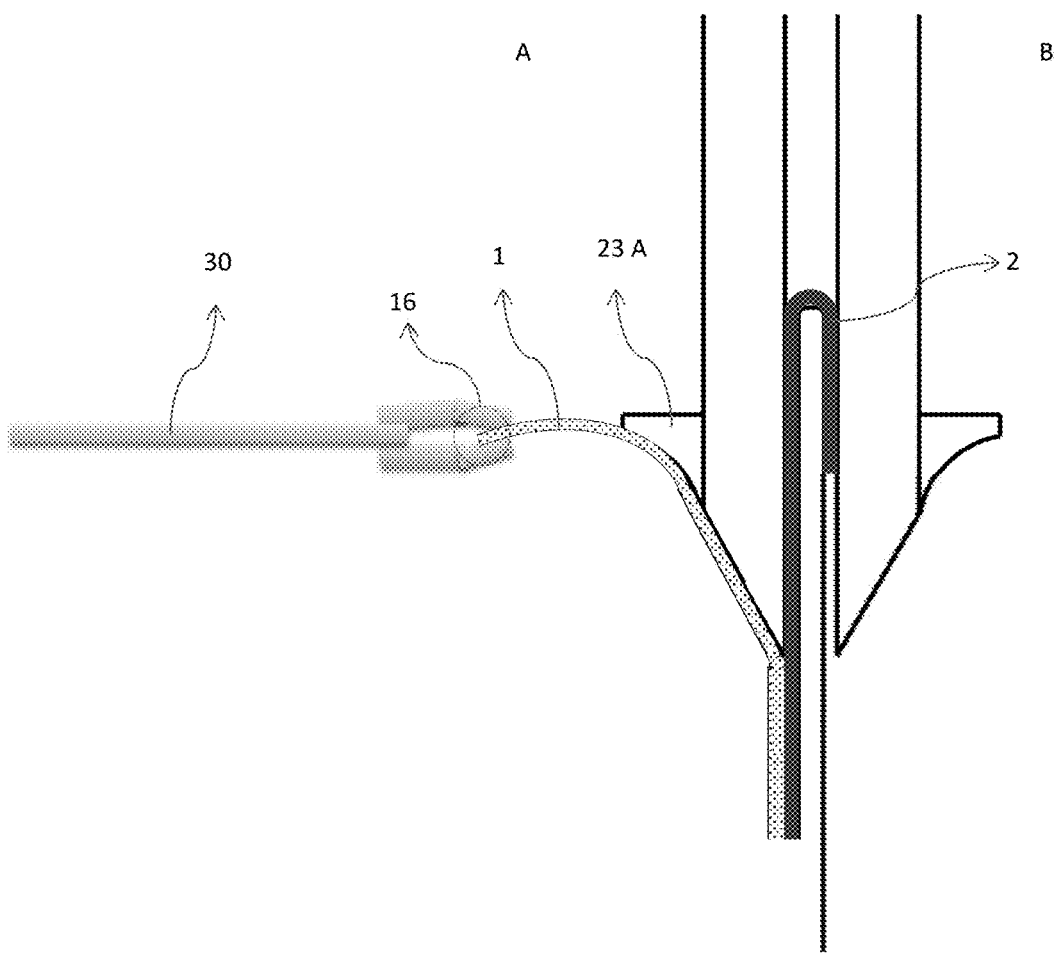
FIG. 12 shows a sixth execution moment in an embodiment of the present invention, wherein the pincer or grapple mechanism has already retained the side A of the PVC section.

FIG. 12 shows a frontal view of an embodiment of the device 100 of the present invention in a sixth moment, wherein said grapple mechanism 30 is located in the known position 16 and holds the section of PVC separated and also located in said known position 16.

Figure 13:
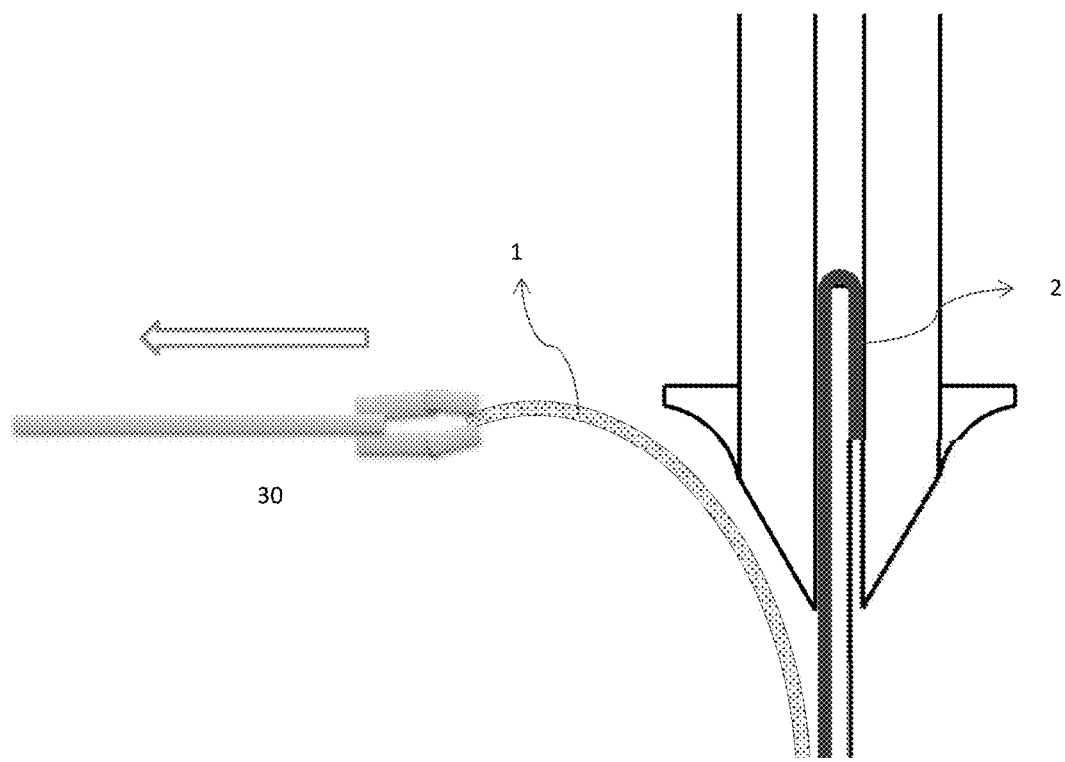
FIG. 13 shows a seventh execution moment in an embodiment of the present invention, wherein while the pincer or grapple element is moving away, it is dividing the rest of the layer of PVC of the piece of carpet

FIG. 13 shows a frontal view of an embodiment of the device 100 of the present invention in a seventh moment, wherein said grapple mechanism 30 is moving away, thus continuing with the separation of the material, at a constant speed and/or force previously defined, which allows the repetition of the process. Said speed and/or moving-away force depends on the materials involved during the separation and on the method used for the corresponding junction. A person skilled in the art will notice that the force and speed used by the grapple mechanism 30 for approaching or moving away may be particular for each material to divide without affecting the subject matter of the present invention. Also, a person skilled in the art will notice that the means to perform said approach and/or move away are already known in the art and may vary without affecting the subject matter of the present invention.

Once the grapple mechanism 30 has been away a distance corresponding to the complete separation of the layer of PVC 1, said grapple mechanism 30 releases the section of material PVC 1 secured, in order to be deposited by gravity in a hopper or deposit.

Figure 14:
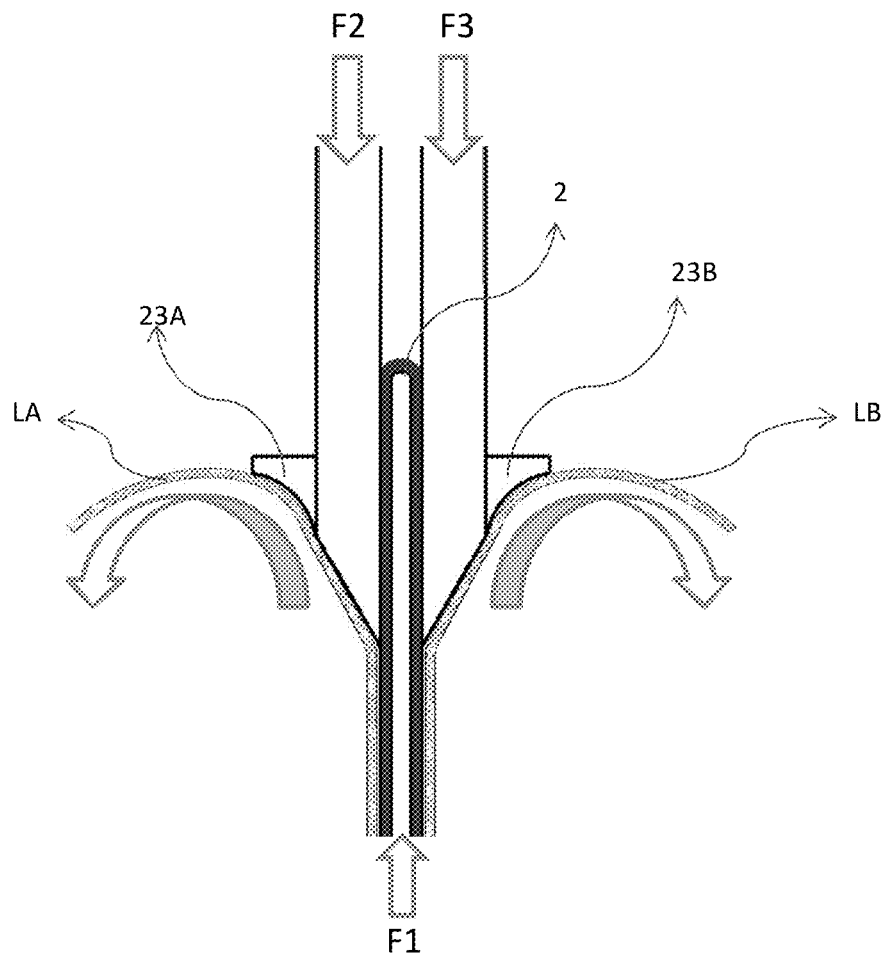
FIG. 14 shows a lateral view of an embodiment of the invention, wherein two sections with a corresponding length substantially equal are separated.

In FIG. 14 is shown a frontal view of an embodiment of the invention, where the piece of carpet 10 is previously disposed in the inlet area 15 at the middle of its length, wherein when the travel of the blades 20 A and 20 B start, this travel is larger or equal to the half of the length of the piece of carpet 10 in such a way that at the end of said travel the piece of carpet is completely separated (no shown in the figures), i.e. the section LA and the section LB are substantially of the same length. In an embodiment of invention, this division method by full travel is applied according to the type of material, and/or composite piece, and/or according to the method of previous junction. Thus, in this embodiment of invention, the material of PVC 1 of the side A, as well the side B, at the end of the division falls by gravity in a hopper or deposit.

In an embodiment of invention, the device only includes the blade of the side A, so that it is applied a single shear stress over the carpet for its division.

In an embodiment of invention, the blades on its inside face are polished, and in an particular embodiment said internal faces have a mirror finish.

In an embodiment of invention, each one of the blades 20 A and 20 B is preheated. In a particular embodiment, the temperature of said preheating is 100° C. A person skilled in the art will appreciate that the method used for the preheating of blades 20 A and 20 B may vary without affecting the subject matter of the present invention.

In an embodiment of invention, the separation distance D of the blades vary during the division process, wherein said distance D is 0 until the blades 20 A and 20 B are close to the counterpart 22, so that around a distance equal to thickness of the layer of nylon 2 or the PVC 1, said separation distance D begins to increase until a maximum which is proportional to the thickness of said layer of nylon 2 or PVC 1. Thus, the separation distance D is variable in time during the execution of the division process.

In an embodiment of invention, instead of using the outlet element 23 A or 23 B, it is used a roller or cylinder that removes the separated material layer by rotating.

In an embodiment of invention, all the elements of the present invention are made in metal. However, a person skilled in the art will appreciated that the manufacturing material of the present invention may vary without affecting the subject matter of the present invention.

Likewise, a plurality of carpet division methods is claimed, which can be applied, either to virgin carpets, recycled and/or any composite material.

In an embodiment of the invention, an electronic identification system that previously identifies the composite material type which will be separated it's applied, so that based on said identification it is performed either a separation in accordance with the embodiment shown in FIG. 13 (by partial travel of blades and using a grapple mechanism) or a separation in accordance with the embodiment shown in FIG. 14 (by full travel of blades). In this regard, the identification of the composite material type is performed by forms and/or technologies already known in the art.

Likewise, a method is revealed, comprising:
heating the piece of carpet to a predetermined temperature through a furnace; disposing the piece in the aperture or inlet zone of the blades and counterpart by means of a mechanized line;
sliding, via a ramp, the piece on a basis that allows said piece to be disposed in a cutting position; determining that the piece of carpet has arrived to an appropriate position of separation through a detection mean coupled to a microcontroller or microprocessor, which can be a sensor of presence, of position, of movement, etc. In one embodiment of invention, the piece of carpet is in an appropriate position by reaching a cap where a detection mean is located that activates the initial mechanism of division; launching a partial division of the carpet by starting the movement of the blades towards the counterpart so that while said movement continues towards its path, a shear stress is applied over the piece and the blades maintaining pressure on the tissue or nylon and separating the PVC by each side of the blades, wherein the travel of the blades is lower than the half of the length of the piece of carpet; approaching in the pincer or grapple mechanism to hold the end or overhang of the resulting PVC material; averting the pincer or grapple mechanism, so that by being the PVC end fasten, this PVC end pull also the remaining material of said PVC of the layer of PVC to separate it from the piece of carpet; releasing the grapple mechanism on a hopper or deposit so that the separated layer of PVC falls by gravity to it.

A method comprising:
heating the piece of carpet to a predetermined temperature through a furnace; disposing the piece in the aperture or inlet zone of the blades and counterpart by means of a mechanized line;
determining that the piece of carpet has arrived to an appropriate position of separation through a detection mean, which determines whether the piece is disposed at the half of its length. In one embodiment of invention, the piece of carpet is in an appropriate position by reaching a cap where a sensor is located that activates the initial mechanism of division; launching a full division of the carpet by starting the movement of the blades towards the counterpart so that while said movement continues towards its path, a shear stress is applied over the piece and the blades down for maintaining pressure on the tissue or nylon and separating the PVC by each side of the blades, wherein the travel of the blades is larger o equal to the half of the length of the piece of carpet; returning the blades to their initial position.

A method to divide a layer of a first material from a second material in a composite piece, the method comprising:

preheating the composite piece; disposing the composite piece between a counterpart and a pair of blades, where said blades are movable along a cutting axis by a predetermined travel distance, and wherein the composite piece is disposed at a substantially lower distance than the half of its length, thus defining a minor side and a larger side; partially separating, using the counterpart and the pair of blades, through a shear stress over the composite piece until the blades have performed their travel, wherein the travel distance is approximately larger than the length of the minor side, holding, through the grapple mechanism, the layer of the first material which is partially separated in the larger side; averting, to a predetermined speed, the grapple mechanism thus separating the remaining of the first material from the second material.

A method to divide a layer of a first material from a second material in a composite piece, the method comprising: preheating the composite piece; disposing the composite piece between a counterpart and a pair of blades, where said blades are movable along a cutting axis by a predetermined travel distance, and wherein the composite piece is disposed at a substantially equal distance to the half of its length; separating, using the counterpart and the pair of blades, through a shear stress over the composite piece until the blades have performed their travel, wherein the travel distance is approximately larger than the half of the length of the composite piece.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

The invention claimed is:

1. A device for dividing a layer of a first material from a layer of a second material in a composite piece, the device comprising:
   a pair of parallel blades separated by a predetermined separation distance, wherein said blades are movable along a cutting axis;
   a counterpart that is fixed respective to the blades, where said counterpart is located over the cutting axis in a parallel relation with the blades and wherein said counterpart is able to be located between and separately from said blades when said blades move along the cutting axis toward said counterpart;
   wherein the blades and the counterpart perform a division of the first material from the second material by applying a double shear stress over the composite piece while the blades move toward the counterpart, wherein the double shear stress includes stress applied by the blades and stress applied by the counterpart; and
   an outlet element coupled to each blade, wherein the outlet element includes a curved form thereby providing a known location to the layer of the first material and the layer of the second material that is under separation, wherein the known location is defined by a trajectory projected by said curved form.

2. The device of claim 1, wherein the counterpart and the blades are separated by approximately the thickness of the layer of the second material when the counterpart is between both blades.

3. The device of claim 1, wherein the counterpart has a thickness whose magnitude is directly proportional to the thickness of either the layer of the first material or the second material of the composite piece.

4. The device of claim 1, wherein the blades further include heaters for heating said blades.

5. The device of claim 4, wherein the blades are heated to a temperature of 100° C.±10° C.

6. A method for dividing a layer of a first material from a layer of a second material in a composite piece, the method comprising:
   preheating the composite piece;
   placing the composite piece between a counterpart and a pair of blades with the layer of the second material facing said counterpart, wherein said blades are movable along a cutting axis by a predetermined travel distance, and wherein the counterpart, which is fixed respective to the blades, is located over the cutting axis in a parallel relation with the blades and wherein said counterpart is able to be located between and separately from said blades when said blades move along the cutting axis toward said counterpart, and wherein the composite piece is disposed over the cutting axis at a distance substantially less than half a length of said composite piece, thus defining a minor side of composite piece and a major side of composite piece;
   dividing, utilizing the counterpart and the pair of blades, the layer of the first material from the layer of the second material by applying a double shear stress over the composite piece while the blades move toward the counterpart until the blades have moved a travel distance that is approximately larger than a length of the minor side, wherein the double shear stress includes stress applied by the blades and stress applied by the counterpart;
   grasping, through a grapple mechanism, the layer of the first material that has been divided in the major side;
   averting, at a predetermined speed, the grapple mechanism transversely from the blades, thus separating the layer of the first material from the layer of the second material.

7. A method of claim 6, wherein the counterpart and the blades are separated by approximately the thickness of the layer of the second material when the counterpart is between both blades.

8. The method of claim 6, wherein the counterpart has a thickness whose magnitude is directly proportional to the thickness of either the layer of the first material or the second material of the composite piece.

9. The method of claim 6, further including an outlet element coupled to each blade, wherein the outlet element includes a curved form thereby providing a known location to the layer of material that is under separation, wherein the known location is defined by a trajectory projected by said curved form.

10. The method of claim 6, wherein the blades further include heaters for heating said blades.

11. The method of claim 10, wherein the blades are heated to a temperature of 100° C.±10° C.

12. The method of claim 6, wherein the method further comprises the step of heating the blades.

13. A system for dividing the layer of a first material from a layer of a second material in a composite piece in combination with a device for dividing a composite piece, the system comprising:
   a device for dividing comprising:
      a counterpart and a pair of blades, said blades are movable along a cutting axis by a predetermined travel distance, wherein the counterpart that is fixed respective to the blades is located over the cutting axis in a parallel relation with the blades and wherein said counterpart is able to be located between and separately from said blades when said blades move along the cutting axis toward said counterpart; and wherein the composite piece is disposed over the cutting axis between the counterpart and the pair of blades with the layer of the second material facing said counterpart at a distance substantially less than half a length of said composite piece, thus defining a minor side of composite piece and a major side of composite piece; and a grapple mechanism for holding a separated layer of the first material, wherein the grapple mechanism can move toward and away from the device for dividing at a constant speed;

wherein the device for dividing divides the layer of the first material from the layer of the second material by applying a double shear stress over the composite piece while the blades move toward the counterpart until the blades have moved a travel distance that is approximately larger than a length of the minor side, wherein the double shear stress includes stress applied by the blades and stress applied by the counterpart; and wherein the grapple mechanism grasps the layer of the first material that has been divided in the major side and averts at a predetermined speed transversely from the device for dividing, thus separating the layer of the first material from the layer of the second material.

14. The system of claim 13, wherein the counterpart and the blades are separated by approximately the thickness of the layer of the second material when the counterpart is between both blades.

15. The system of claim 13, wherein the counterpart has a thickness whose magnitude is directly proportional to the thickness of either the layer of the first material or the second material of the composite piece.

16. The system of claim 13, wherein the device includes an outlet element coupled to each blade, wherein the outlet element includes a curved form thereby providing a known location to the layer of material that is under separation, wherein the known location is defined by a trajectory projected by said curved form.

17. The system of claim 13, wherein the blades further include heaters for heating said blades.

18. The system of claim 17, wherein the blades are heated to a temperature of 100° C.±10° C.

19. The system of claim 13, wherein the system further includes heaters for heating the composite piece.

* * * * *